United States Patent
Jufuku (10) Patent No.: US 8,197,980 B2
(45) Date of Patent: Jun. 12, 2012

(54) FUEL CELL MOUNTED ON A MOBILE UNIT

(75) Inventor: Yasunobu Jufuku, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 257 days.

(21) Appl. No.: 12/514,802

(22) PCT Filed: May 21, 2008

(86) PCT No.: PCT/IB2008/001263
§ 371 (c)(1),
(2), (4) Date: May 14, 2009

(87) PCT Pub. No.: WO2008/142535
PCT Pub. Date: Nov. 27, 2008

(65) Prior Publication Data
US 2010/0068581 A1  Mar. 18, 2010

(30) Foreign Application Priority Data

May 22, 2007  (JP) .................................. 2007-135699

(51) Int. Cl.
*H01M 2/20* (2006.01)
*B60K 1/00* (2006.01)
(52) U.S. Cl. ........ 429/467; 429/469; 429/470; 429/471; 180/65.31
(58) Field of Classification Search .................. 429/469, 429/467, 470, 511, 468, 471, 507, 508; 180/65.31, 180/68.5, 65.1
See application file for complete search history.

(56) References Cited

U.S. PATENT DOCUMENTS

| 4,621,033 A | 11/1986 | Tsutsumi et al. |
| RE42,720 E * | 9/2011 | Tanaka et al. ................. 429/469 |

FOREIGN PATENT DOCUMENTS

| CN | 1614797 | 5/2005 |
| DE | 100 33 989 A1 | 5/2002 |
| JP | 01-279575 | * 11/1989 |
| JP | 04-296463 | * 10/1992 |
| JP | 5-82157 | 4/1993 |
| JP | 8-171926 | 7/1996 |
| JP | 2002-367651 | 12/2002 |
| JP | 2002-367652 | * 12/2002 |
| JP | 2004-247139 | 9/2004 |
| JP | 2005-100755 | 4/2005 |
| JP | 2006-331648 | 12/2006 |
| JP | 2008-132800 | 6/2008 |

* cited by examiner

OTHER PUBLICATIONS

First Office Action for Chinese Patent Appl. No. 200880001218.1 dated May 25, 2011.

*Primary Examiner* — Raymond Alejandro
(74) *Attorney, Agent, or Firm* — Finnegan, Henderson, Farabow, Garrett & Dunner, LLP

(57) ABSTRACT

A fuel cell is mounted in a mobile unit. The fuel cell may include a stacked assembly composed of a plurality of stacked power generation elements held between a first rigid plate and a second rigid plate. The plurality of stacked power generation elements may be stacked adjacent to one another in a stacked direction and along a central stack axis. The central stack axis may extend through a center of gravity of the fuel cell. A first mount, a second mount, and a third mount may be used to mount the fuel cell to the mobile unit. Each of the first mount, the second mount, and the third mount may be an insulating elastic element that suppresses vibration transferred from the mobile unit to the fuel cell.

13 Claims, 9 Drawing Sheets

ENLARGED VIEW OF REGION X

FUEL CELL MOUNTED ON A MOBILE UNIT

CROSS-REFERENCE TO RELATED APPLICATIONS

This application is a national phase application of International Application No. PCT/IB2008/001263, filed May 21, 2008, and claims the priority of Japanese Application No. 2007-135699, filed May 22, 2007, the contents of both of which are incorporated herein by reference.

BACKGROUND OF THE INVENTION

1. Field of the Invention

The present invention relates to a mobile unit having a fuel cell.

2. Description of the Related Art

When a fuel cell is mounted on a mobile unit, mounts which are insulating elastic elements are disposed between the mobile unit and the fuel cell to suppress vibration transferred from the mobile unit to the fuel cell (see Japanese Patent Application Publication No. 2006-331648 (JP-A-2006-331648)). In the fuel cell, for example, a stacked assembly including at least a plurality of stacked power generation elements is held between two rigid plates. Examples of the mobile unit include vehicles such as automobiles, electric trains and steam trains, robots, airplanes, and linear motor cars.

When the mounts are disposed between the mobile unit and the fuel cell to suppress vibration transferred to the fuel cell, it may be necessary to use mounts having three-dimensional elastic properties, for example, which complicates the structure of the mounts.

In addition to provide resistance to external forces such as deformation, it is necessary to attach mounts to rigid portions of the fuel cell, such as the rigid plates mentioned above. Meanwhile, in order to suppress vibration around the central portion of the fuel cell, it is preferred to attach a mount generally around the center of the fuel cell in the direction in which the power generation elements are stacked. However, because the rigid plates are located at both ends of the fuel cell, it is difficult to attach a mount around the central portion of the fuel cell in the stacked direction. Therefore, when the fuel cell is mounted on the mobile unit, the vibration is significant around the central portion of the fuel cell in the stacked direction, which damage the fuel cell. The phrase "around the central portion (of the fuel cell) in the stacked direction" refers to an inner portion of the fuel cell, rather than the ends, in the direction in which the power generation elements are stacked.

SUMMARY OF THE INVENTION

The invention provides a technique that allows attaching a mount disposed between a mobile unit and a fuel cell around the central portion of the fuel cell in the stacked direction of the fuel cell without complicating the structure of the mount.

A first aspect of the invention is related to a mobile unit having a fuel cell. In the fuel cell mounted on the mobile unit, a stacked assembly composed of a plurality of stacked power generation elements is held between two rigid plates. The mobile unit having the fuel cell includes: a first mount, a second mount, and a third mount each of which is an insulating elastic element that suppresses vibration transferred from the mobile unit to the fuel cell. The first mount and the second mount are both disposed in proximity to a central portion of a plate surface of the rigid plates. The rigid plates are pressed toward each other. The third mount is disposed at one of the side surface that extends along a stacked direction of the stacked assembly of the fuel cell, and presses the one of the side surface in a direction generally perpendicular to the stacked direction of the stacked assembly.

According to the above aspect, the complication of the structure of the mounts that are disposed between the mobile unit and the fuel cell can be avoided.

In the above aspect, the first mount and the second mount may be both disposed at in proximity to the central portion in the plate surface of the rigid plates and above the center of gravity of the fuel cell in the plate surface of the rigid plates, and the third mount may be disposed below the center of gravity on the one of the side surface of the fuel cell. According to this aspect, vibration of the fuel cell in the upper-and-lower direction can be suppressed.

In the above aspect, the first mount and the second mount may be both disposed at in proximity of the central portion in the plate surface of the rigid plates and below the center of gravity of the fuel cell in the plate surface of the rigid plates, and the third mount may be disposed above the center of gravity on the one of the side surface of the fuel cell. According to this aspect, vibration of the fuel cell in the upper-and-lower direction can be suppressed.

In the above aspect, the first mount and the second mount may be both disposed at the same height on the surface of the rigid plates with respect to the center of gravity of the fuel cell in the plate surface of the rigid plates. According to this aspect, the fuel cell can be prevented from being subject to a rotational force.

In the above aspect, both the first mount and the second mount may be disposed at a predetermined distance from the third mount. According to this aspect, the fuel cell can further be prevented from being subjected to a rotational force.

In the above aspect, the third mount may be disposed at a side surface of either one of the rigid plates that extends in the stacked direction. According to this aspect, the third mount can efficiently suppress vibration transferred to the fuel cell.

In the above aspect, the stacked assembly may include a rigid fluid distribution plate disposed between the power generation elements in the stacked assembly to that distributes at least one of a reaction gas and a cooling medium to the power generation elements, and the third mount may be disposed at a side surface of the fluid distribution plate that extends in the stacked direction. According to this aspect, the third mount can efficiently suppress vibration transferred to around the central portion of the fuel cell in the stacked direction.

In the above aspect, the third mount may be disposed at a side surface, that extends in the stacked direction, of the rigid plates which hold therebetween the stacked assembly composed of a plurality of stacked elements. According to this aspect, the third mount can obtain the same effect as in the case where it is disposed at a side surface of the fluid distribution plate that extends in the stacked direction.

In the above aspect, the mobile unit may be a vehicle, and the vehicle may include: a plurality of side frames disposed in parallel with each other to extend longitudinal direction of the vehicle; a first bracket coupled to the first mount and a first side frame, of the plurality of side frames, to support the first mount through the first side frame; and a second bracket coupled to the second mount and a second side frame, of the plurality of side frames, to support the second mount through the second side frame. According to this aspect, the fuel cell can be securely fixed to the vehicle.

In the above aspect, the vehicle may further include: a floor panel disposed on the side frames; and a third bracket that supports the third mount. The third bracket may be fixed to the floor panel.

In the above aspect, the vehicle may further include: a cross frame that extends between the side frames; and a third bracket that supports the third mount. The third bracket may be fixed to the cross frame.

In the above aspect, the upper direction may correspond to a direction from a surface for attachment of the fuel cell to the fuel cell, and the lower direction may correspond to a direction from the fuel cell to the surface for attachment of the fuel cell. In addition, the upper direction may correspond to an opposite direction of a direction of gravity, and the lower direction may correspond to the direction of gravity.

In the above aspect, the first mount and the second mount may suppress vibration in the stacked direction. The third mount may suppress vibration in a direction perpendicular to the stacked direction.

In the above aspect, the stacked direction may correspond to a left-right direction of the mobile unit of the stacked assembly lies in a longitudinal direction of the mobile unit.

In the above aspect, the fuel cell may include: a stacked assembly in which a plurality of power generation elements are stacked; and a rigid fluid distribution plate provided between the power generation elements in the stacked assembly that distributes at least one of a reaction gas and a cooling medium to the power generation elements. The fluid distribution plate may be disposed in the mobile unit, and the fluid distribution plate may include the third mount.

A second aspect of the invention is directed to a mobile unit having a fuel cell. The mobile unit having a fuel cell is characterized as follows. The fuel cell includes: a stacked assembly in which a plurality of power generation elements are stacked; and a rigid fluid distribution plate provided between the power generation elements in the stacked assembly that distributes at least one of a reaction gas and a cooling medium to the power generation elements. The fluid distribution plate is disposed in the mobile unit. The fluid distribution plate includes a mount which is an insulating elastic element that suppresses vibration transferred from the mobile unit to the fuel cell.

According to the above aspect, the mount disposed at the fluid distribution plate can suppress vibration transferred to around the central portion of the fuel cell in the stacked direction.

In the above aspect, the mobile unit having a fuel cell may include: a supply/discharge pipe that supplies and discharges at least one of the reaction gas and the cooling medium to and from the fluid distribution plate, or a fluid-controlling valve that is used for at least one of the reaction gas and the cooling medium supplied to and discharged from the fluid distribution plate. The supply/discharge pipe, or the fluid-controlling valve, may be disposed at the fluid distribution plate.

According to this aspect, the supply/discharge pipe, or the fluid-controlling valve, can be securely fixed. In addition, the supply/discharge pipe, or the fluid-controlling valve, can be attached without providing an attachment boss or the like, which can reduce the number of parts.

In the above aspect, an outer periphery of the fluid distribution plate may partly project with respect to the power generation elements to form a projection, and the fluid-controlling valve may be disposed at the projection of the fluid distribution plate. According to this aspect, a large number of supply/discharge pipes and fluid-controlling valve can be disposed at the fluid distribution plate.

In the above aspect, the mount may be disposed at the projection.

In the above aspect, the fluid distribution plate may be held between the power generation elements at a position dividing the stacked assembly generally equally in a stacked direction of the stacked assembly. According to this aspect, vibration around the central portion of the fuel cell in the stacked direction can further be suppressed.

In the above aspect, the mount may be configured to suppress vibration in a direction perpendicular to the stacked direction.

The present invention may alternatively be implemented as a product invention that is applicable to devices other than the mobile unit described above such as vehicles, fuel cell-mounting systems, and so forth. In addition, the present invention may alternatively be implemented as a method invention that is applicable to methods for systems in which a fuel cell is mounted on a mobile unit, fuel cell-mounting systems, and so forth.

BRIEF DESCRIPTION OF THE DRAWINGS

The foregoing and further, features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
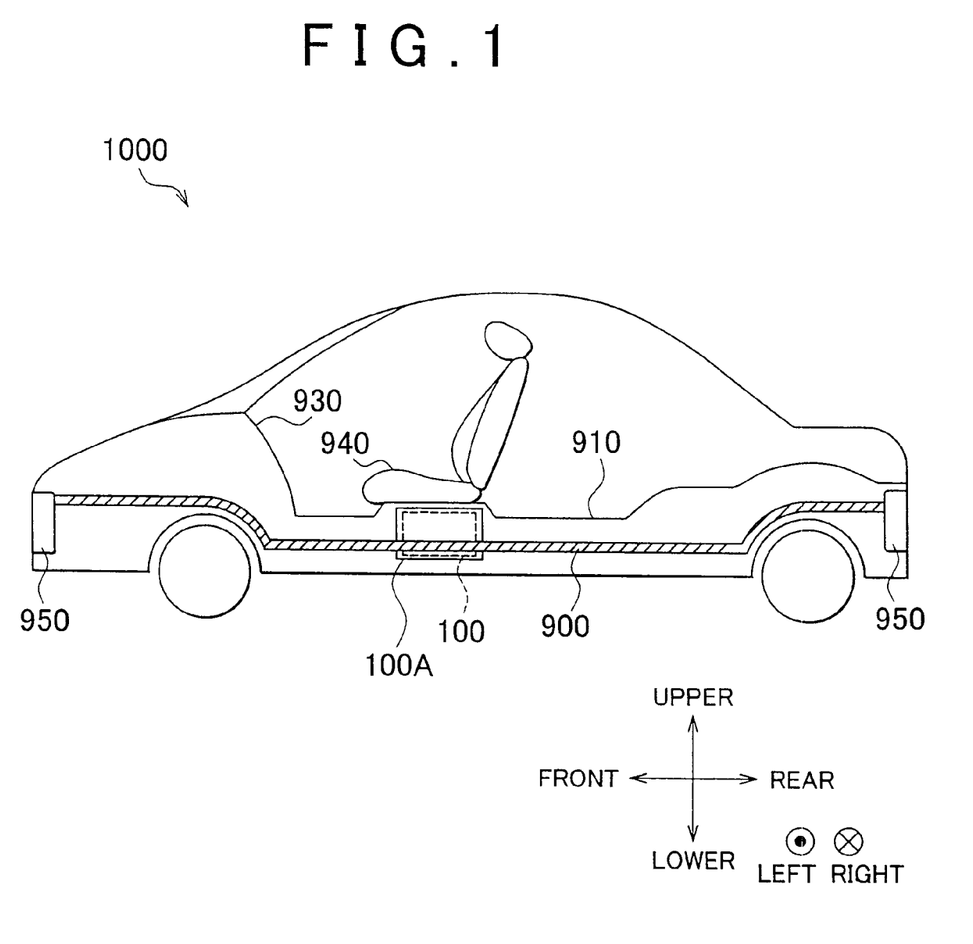
FIG. 1 is a diagram illustrating the position of a fuel cell mounted on a vehicle as an embodiment of the present invention.

A description will hereinafter be made of an embodiment of the present invention. FIG. 1 is a diagram illustrating the position of a fuel cell 100 mounted on a vehicle 1000 as an embodiment of the present invention. In the following description, the advancing direction of the vehicle 1000 is referred to as "front direction," the direction opposite to the front direction is referred to as "rear direction," the direction from the bottom toward the roof of the vehicle 1000 is referred to as "upper direction," the direction from the roof toward the bottom is referred to as "lower direction," the direction toward the right when facing the front direction is referred to as "right direction," and the direction toward the left is referred to as "left direction." The front direction and the rear direction are collectively referred to as "front-rear direction," the upper direction and the lower direction are collectively referred to as "upper-lower direction," and the left direction and the right direction are collectively referred to as "left-right direction." The definitions of these directions may be appropriately changed according to the orientation of a floor panel to be described later.

The vehicle 1000 shown in FIG. 1 is a four-wheel sedan, for example, which has a vehicle body of a monocoque structure.

The vehicle 1000 includes, as framework members, a pair of side frames 900 disposed along the front-and-rear direction, and a floor panel 910 disposed on the pair of side frames 900. The side frames 900 are connected to bumpers 950 at the front and the rear of the vehicle 1000. The floor panel 910 is connected to a dash panel 930. The space above the floor panel 910 and surrounded by the floor panel 910 and the dash panel 930 is used as a cabin that accommodates passengers. A passenger's seat 940 for a passenger such as a driver to sit on is disposed in the cabin. In the vehicle 1000 in accordance with this embodiment, the fuel cell 100 is disposed under the passenger's seat 940 and below the floor panel 910, using parts to be described later. The details will be described later.

Figure 2:
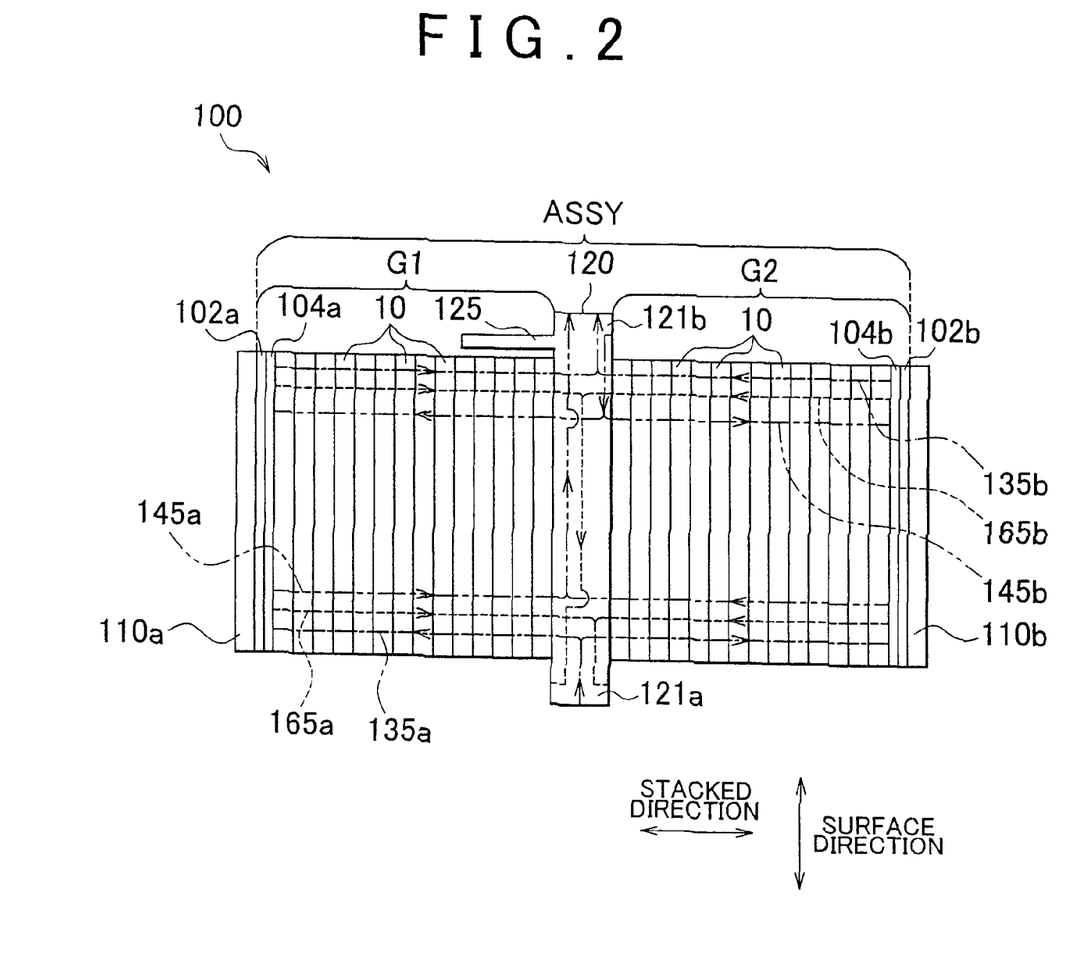
FIG. 2 shows an appearance of the fuel cell mounted on the vehicle.

FIG. 2 shows an appearance of the fuel cell 100 mounted on the vehicle 1000. In the fuel cell 100, a stacked assembly ASSY is held between end plates 110a and 110b. The end plates 110a and 110b are rigid plates and made of titanium. The end plates 110a and 110b may be rigid plates made of any materials such as stainless steel or iron, for example.

The stacked assembly ASSY includes an insulating plate 102a, a current collector plate 104a, a plurality of power generation units 10, a fluid distribution plate 120, a plurality of power generation units 10, a current collector plate 104b, and an insulating plate 102b, which are stacked in this order. Hereinafter, the direction in which these components are stacked is referred to as "stacked direction." Meanwhile, the direction perpendicular to the stacked direction, and along the power generation units 10 and the fluid distribution plate 120, is referred to as "surface direction."

The fluid distribution plate 120 is a rigid plate made of titanium. As shown in FIG. 2, the fluid distribution plate 120 has projections 121a and 121b, that is the outer periphery of the fluid distribution plate 120, project more than the power generation units 10 in the surface direction, and the projection 121b has a protrusion 125 extending along the stacked direction.

The fluid distribution plate 120 is disposed at the central portion of the stacked assembly ASSY in the stacked direction. The fluid distribution plate 120 divides the stacked assembly ASSY generally equally into two groups (hereinafter, the left group in FIG. 2 is referred to as "group G1" and the right group is referred to as "group G2"). The fluid distribution plate 120 also distributes reaction gases (air and hydrogen) and a cooling medium (such as coolant) LLC to the power generation units 10 of the respective groups.

Specifically, as shown in FIG. 2, inside the power generation units 10 and the fluid distribution plate 120 are formed an air supply manifold 135a, an air discharge manifold 135b, a hydrogen supply manifold 145a, a hydrogen discharge manifold 145b, a cooling medium supply manifold 165a, and a cooling medium discharge manifold 165b. The reaction gas and the cooling medium LLC supplied to the fluid distribution plate 120 are distributed from the fluid distribution plate 120 to the power generation units 10 of the respective groups via these manifolds, and discharged to the outside via the fluid distribution plate 120. The cooling medium LLC supply manifold 165a and the cooling medium discharge manifold 165b are formed to pass generally through the center of the fluid distribution plate 120. This can avoid uneven distribution of heat in the fluid distribution plate 120. The details of a supply/discharge pipe that supplies and discharges the reaction gases and the cooling medium LLC to and from the fluid distribution plate 120 and so forth will be described later.

Figure 3A:
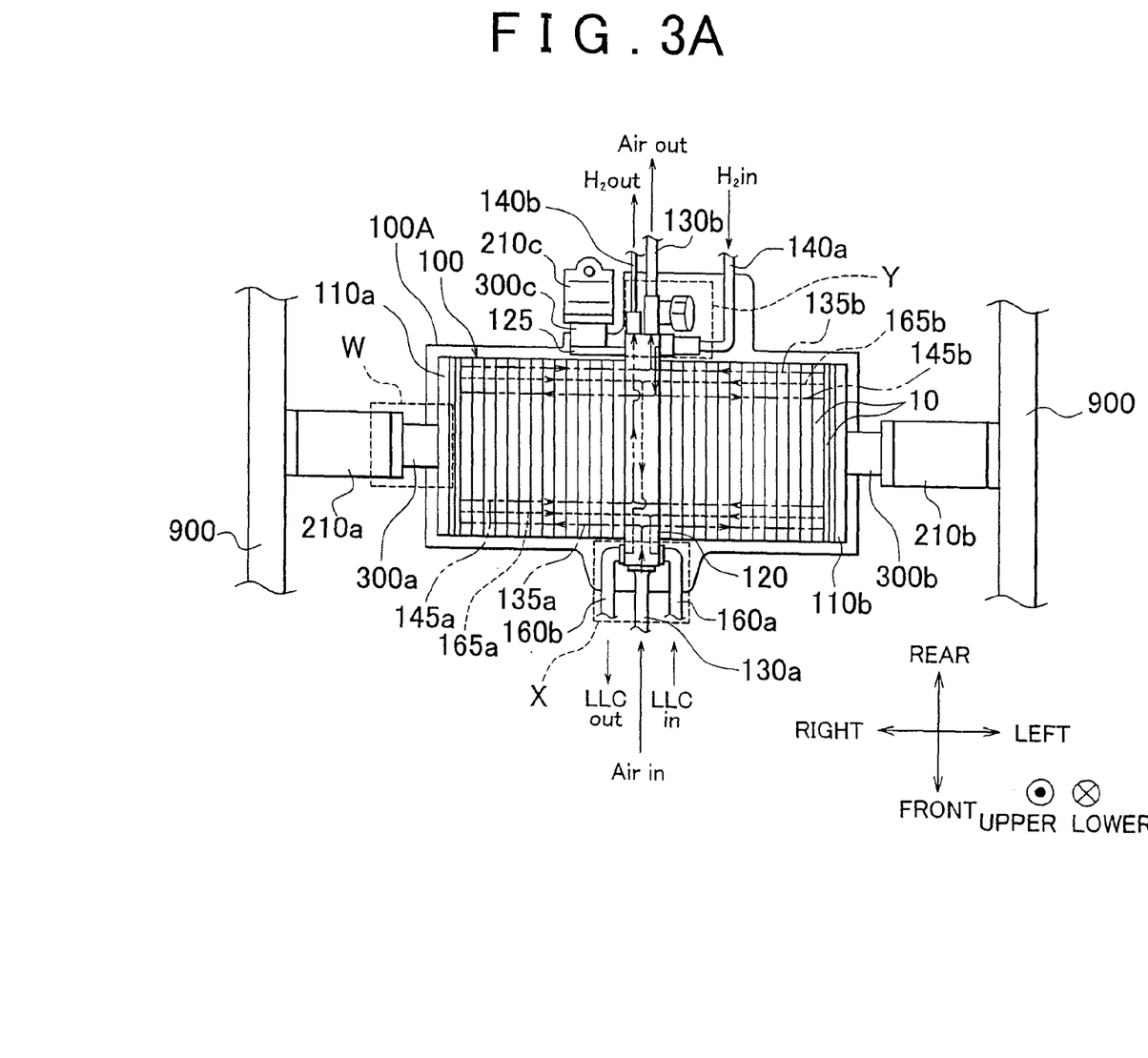
FIGS. 3A and 3B show the fuel cell mounted on the vehicle.
Figure 3B:
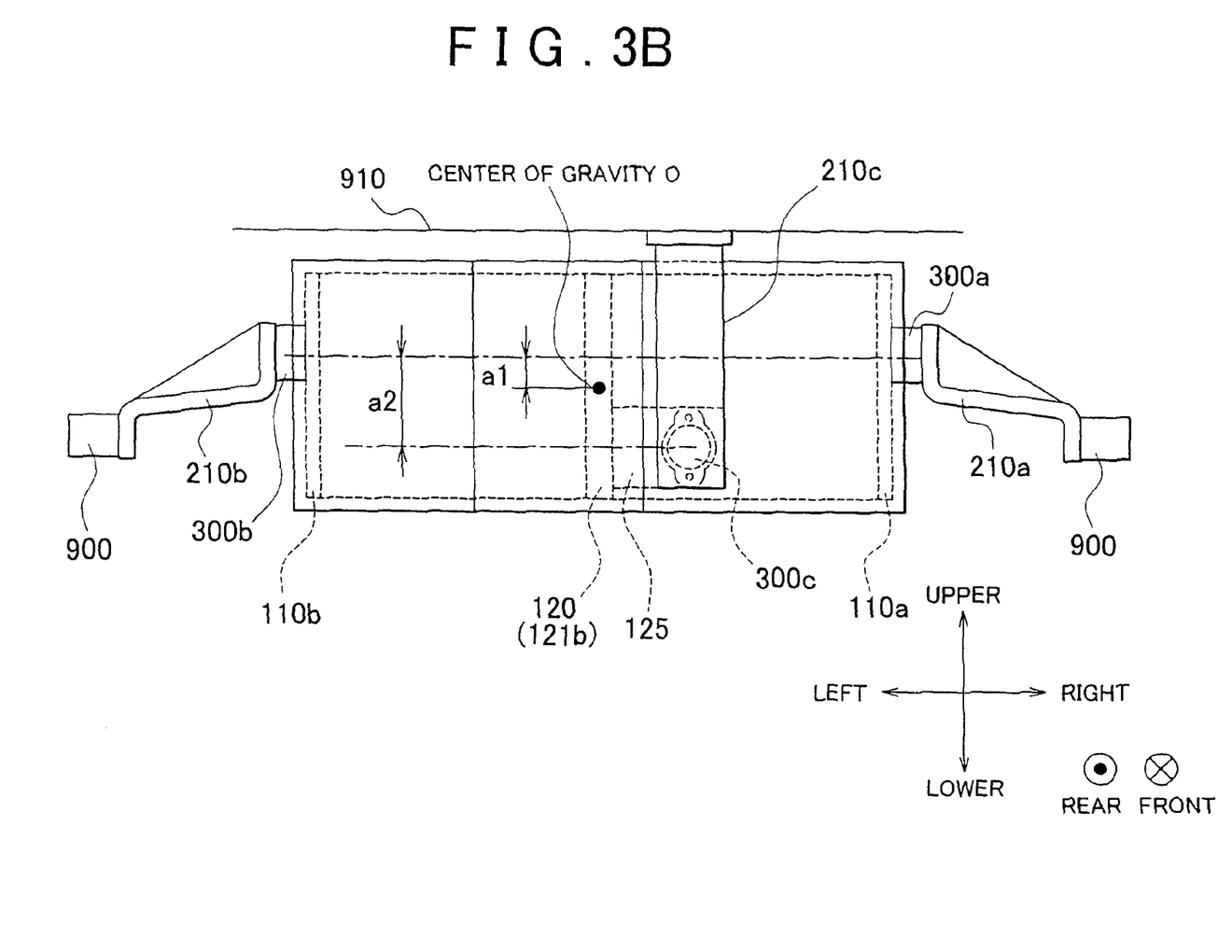

FIGS. 3A and 3B show the fuel cell 100 mounted on the vehicle 1000. FIG. 3A is a plan view of the fuel cell 100, and FIG. 3B is a view of the fuel cell 100 looking from behind. The fuel cell 100 is covered by a fuel cell case 100A. In FIG. 3A, the fuel cell case 100A is partly not shown to visualize the inside of the fuel cell case 100A as well.

In the vehicle 1000, the fuel cell 100 is supported at three locations by brackets 210a, 210b, and 210c as support members. At these locations, the fuel cell 100 is connected to the brackets 210a, 210b, and 210c via a first mount 300a, a second mount 300b, and a third mount 300c, respectively. These mounts are each an insulating elastic element (for example, rubber) that suppresses vibration transferred from the vehicle 1000 to the fuel cell 100. The first mount 300a and the second mount 300b are configured to have large elastic properties mainly in the left-right direction and the upper-lower direction rather than in the front-rear direction, and the third mount 300c is configured to have large elastic properties mainly in the front-rear direction and the upper-lower direction rather than in the left-right direction.

As shown in FIGS. 3A and 3B, the first mount 300a is disposed around the central portion of the end plate 110a (a plate surface extending along the front-and-rear direction) and above the center of gravity O of the fuel cell 100 (at a distance a1 above the center of gravity O). The first mount 300a presses the end plate 110a (the fuel cell 100) from the right to the left (in the stacked direction). Likewise, as shown in FIGS. 3A and 3B, the second mount 300b is disposed around the central portion of the end plate 110b (a plate surface extending along the front-and-rear direction) and above the center of gravity O of the fuel cell 100 (at a distance a1 above the center of gravity O). The second mount 300b presses the end plate 110b (the fuel cell 100) from the left to the right (in the stacked direction). In addition, as shown in FIGS. 3A and 3B, the third mount 300c is disposed at the protrusion 125 of the fluid distribution plate 120 and below the center of gravity O of the fuel cell 100 (at a distance a2 below the center of gravity O). The third mount 300c presses the fluid distribution plate 120 (the fuel cell 100) from the rear to the front. The abovementioned "around the central portion" may correspond to in proximity to a central portion in the invention.

Figure 4:
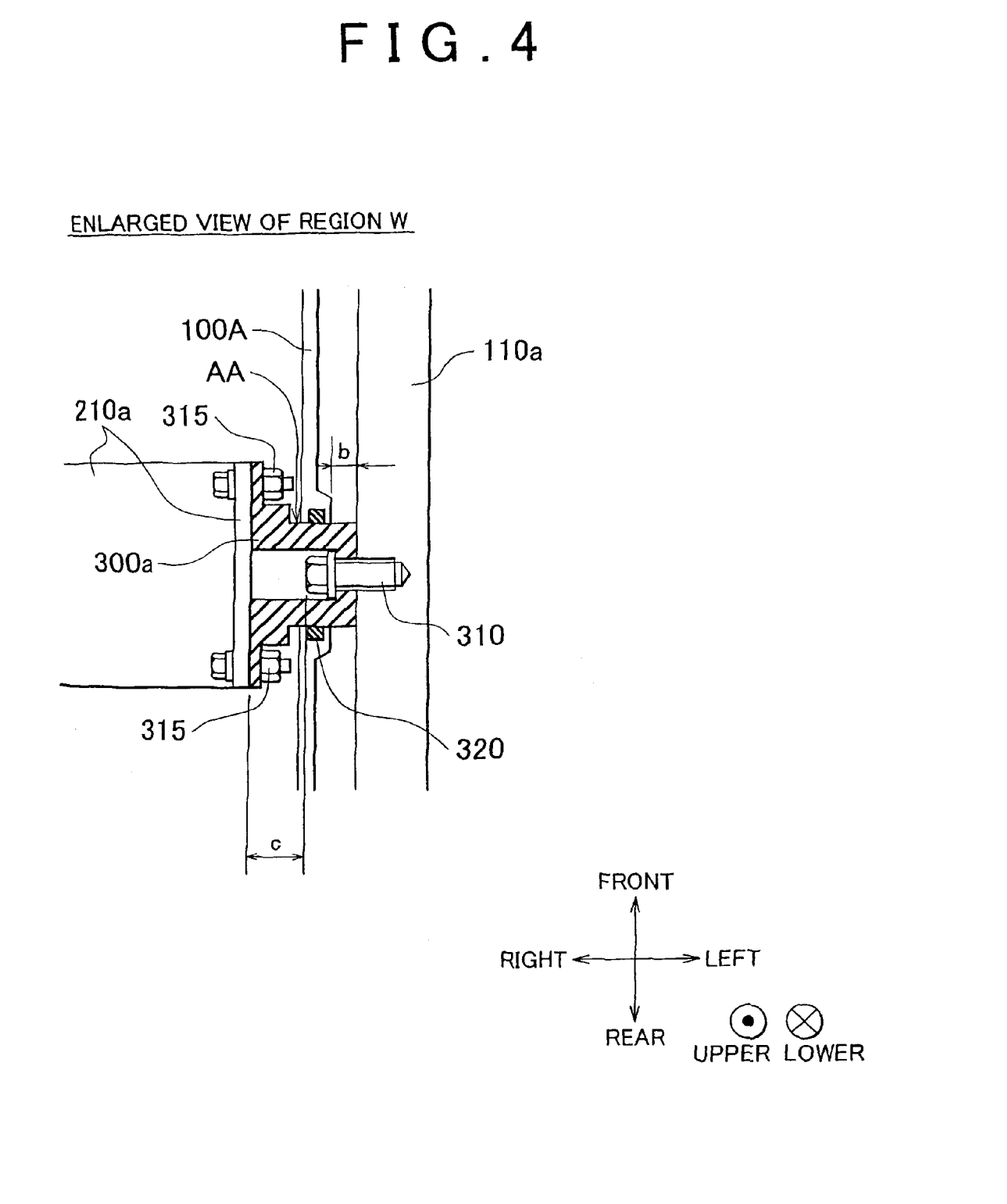
FIG. 4 is an enlarged view of the region W in FIG. 3.

FIG. 4 is an enlarged view of the region W in FIG. 3A. More particularly, FIG. 4 shows the connection between the first mount 300a and the fuel cell 100. In FIG. 4, the first mount 300a is shown as obliquely hatched. The first mount 300a is fixed to the bracket 210a by bolts 315. The first mount 300a is inserted into the hole AA formed in the fuel cell case 100A, and fixed to the end plate 110a of the fuel cell 100 by a mount bolt 310. The fuel cell case 100A and the end plate 110a are distance b apart from each other. The fuel cell case 100A and the bracket 210a are distance c apart from each other. Since the first mount 300a has insulating properties, the fuel case 100A, the end plate 110a and the bracket 210a are insulated from each other. Likewise, the second mount 300b is fixed to the bracket 210b by bolts 315, and to the end plate 110b by means of a mount bolt 310. In addition, the third mount 300c is fixed to the bracket 210c by means of bolts 315, and to the protrusion 125 of the fluid distribution plate 120 by means of a mount bolt 310. An O-ring 320 as a seal member is provided between the fuel cell case 100A and each mount (see FIG. 4). The brackets 210a, 210b are fixed to the side frame 900 by a bolt (not shown). The bracket 210c is fixed to the floor panel 910 by a bolt (not shown).

The respective mounts are attached as follows. Prepare a fuel cell case 100A in which a fuel cell 100 is accommodated. Insert the mounts into holes AA of the fuel cell case 100A. Next, fix the mounts to the end plate 110a, the end plate 110b, and the protrusion 125, using mount bolts 310. Then, fix the mounts to the bracket 210a, the bracket 210b, and the bracket 210c respectively using the bolts 315.

Figure 5A:
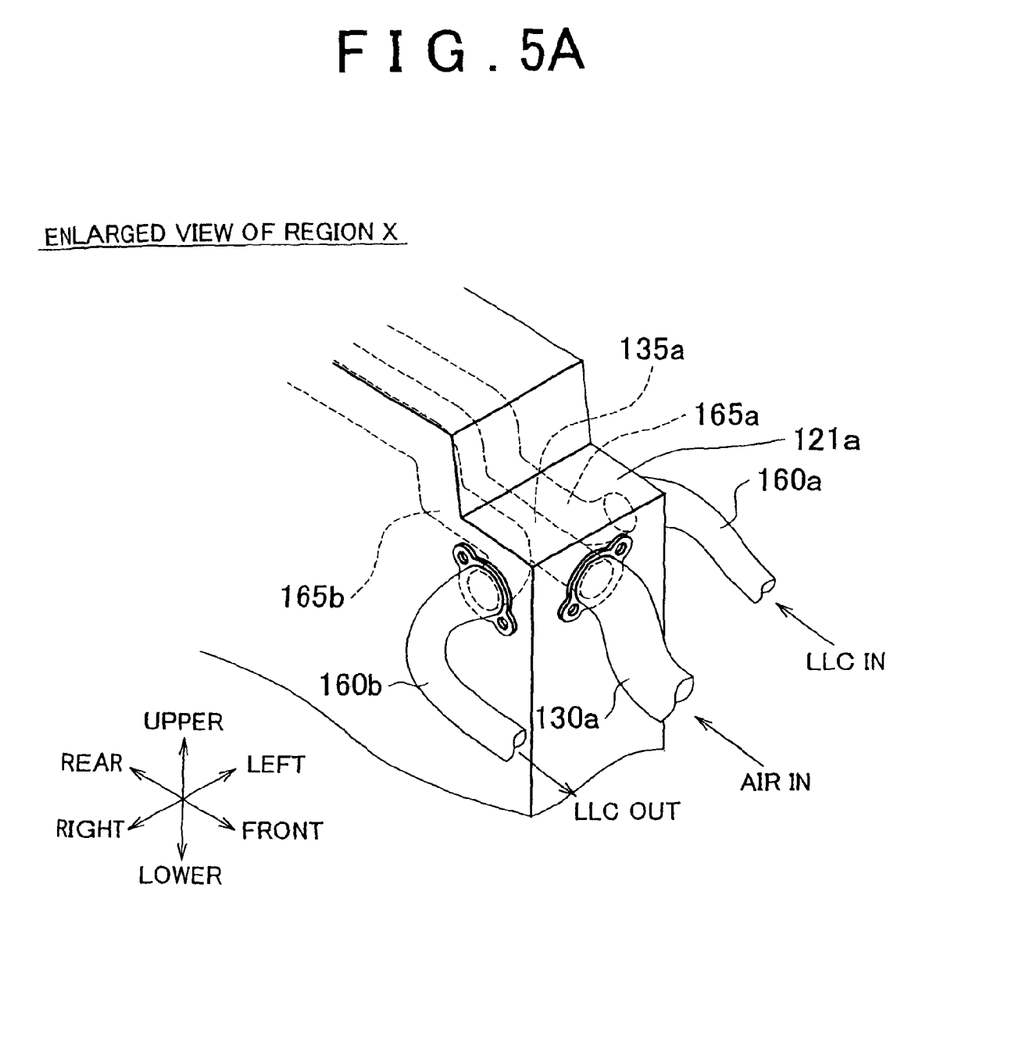
FIG. 5A is an enlarged view of the region X in FIG. 3.
Figure 5B:
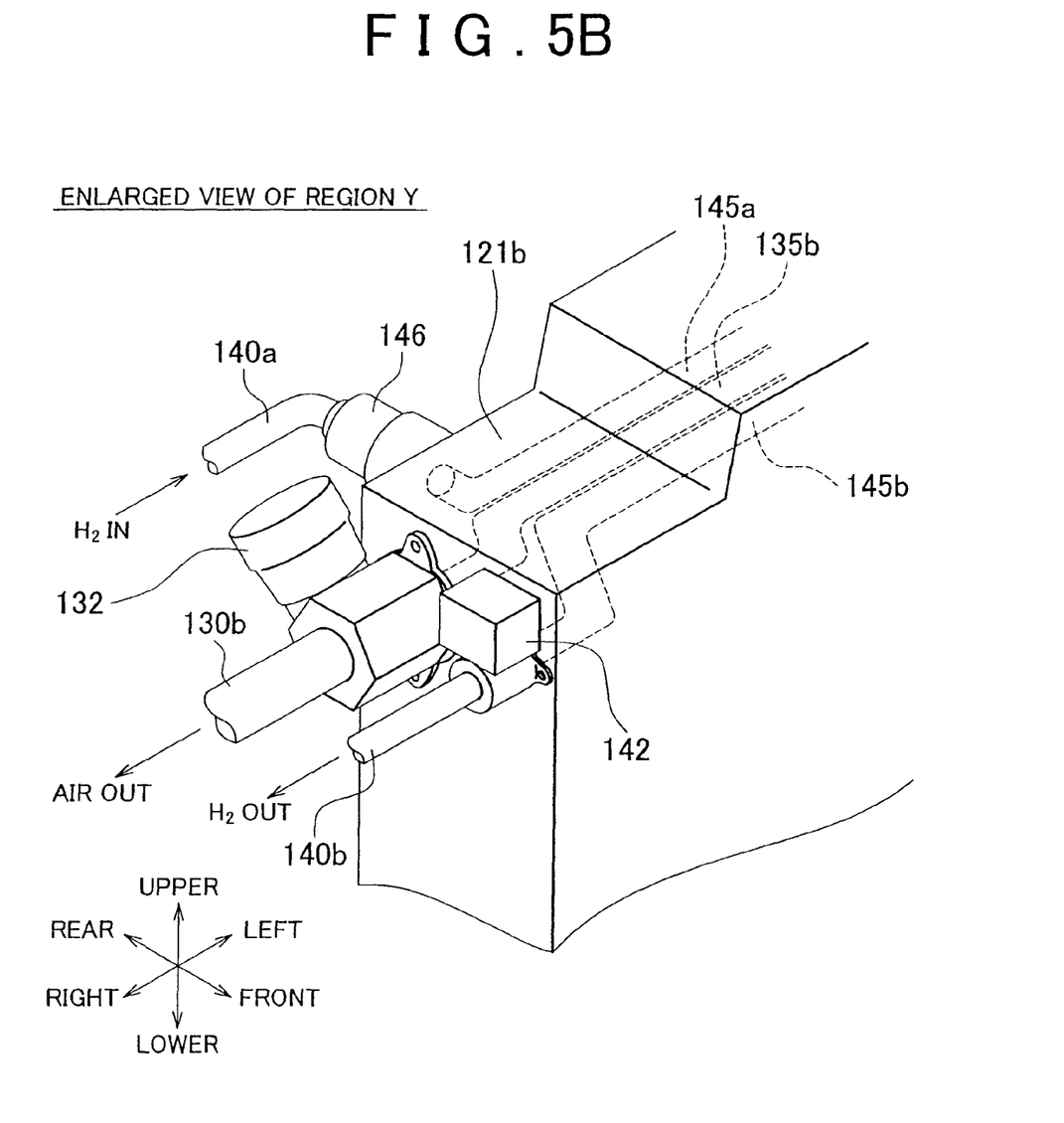
FIG. 5B is an enlarged view of the region Y in FIG. 3.

FIGS. 5A and 5B are enlarged views of the region X and the region Y in FIG. 3A respectively. More particularly, FIG. 5A illustrates devices to be connected to the projection 121a of the fluid distribution plate 120, and FIG. 5B illustrates devices to be connected to the projection 121b of the fluid distribution plate 120.

As shown in FIG. 5A, at the projection 121a are provided an air induction pipe 130a connected to the air supply manifold 135a to induct air (Air) as oxidant gas to the air supply manifold 135a, a coolant induction pipe 160a connected to the cooling medium supply manifold 165a to induct the cooling medium LLC to the cooling medium supply manifold 165a, and a coolant discharge pipe 160b connected to the cooling medium discharge manifold 165b to discharge the cooling medium LLC from the cooling medium discharge manifold 165b to the outside of the fuel cell 100.

In addition, as shown in FIG. 5B, at the projection 121b are provided a hydrogen pressure regulator 146 connected to the hydrogen supply manifold 145a to adjust the pressure of hydrogen ($H_2$) as fuel gas, an air pressure adjustment valve 132 connected to the air discharge manifold 135b to adjust the pressure of air to be discharged to the outside of the fuel cell 100, and a hydrogen shut-off valve 142 connected to the hydrogen discharge manifold 145b to shut off hydrogen to be discharged to the outside of the fuel cell 100. A hydrogen induction pipe 140a is connected to the hydrogen pressure regulator 146 to induct hydrogen. An air discharge pipe 130b is connected to the air pressure adjustment valve 132 to discharge air from the air discharge manifold 135b to the outside of the fuel cell 100. A hydrogen discharge pipe 140b is connected to the hydrogen shut-off valve 142 to discharge hydrogen from the hydrogen discharge manifold 145b to the outside of the fuel cell 100.

The hydrogen pressure regulator 146, the air pressure adjustment valve 132, and the hydrogen shut-off valve 142 are each a device that is used for fluid such as air and hydrogen. These valves may correspond to a fluid-controlling valve in the invention.

As described above, in the vehicle 1000 in accordance with this embodiment, the fuel cell 100 is supported at three locations, that is, around the central portion of the end plate 110a, around the generally central portion of the end plate 110b, and at the protrusion 125 of the fluid distribution plate 120, via the first mount 300a, the second mount 300b, the third mount 300c. The first mount 300a presses the fuel cell 100 from the right toward the left, the second mount 300b presses it from the left toward the right, and the third mount 300c presses it from the rear toward the front. With this configuration, because the third mount 300c suppresses vibration in the front-rear direction, the first mount 300a and the second mount 300b are not required to have large elastic properties in the front-rear direction. Also, because the first mount 300a and the second mount 300b suppress vibration in the left-right direction, the third mount 300c is not required to have large elastic properties in the left-right direction. Thus, the respective mounts are required to have large elastic properties only in two dimensions, which avoid the complication of the structure of the mounts.

In addition, in the vehicle 1000 in accordance with this embodiment, both the first mount 300a and the second mount 300b may be disposed above the center of gravity O of the fuel cell 100, and the third mount 300c may be disposed below the center of gravity O of the fuel cell 100 (at a distance a2 below the center of gravity O). With this configuration, vibration transferred to the upper portion of the fuel cell 100 can be damped by the first mount 300a and the second mount 300b, and vibration transferred to the lower portion of the fuel cell 100 can be damped by the third mount 300c. Further, both the first mount 300a and the second mount 300b are disposed at the central portion of the respective end plates and at a distance a1 above the center of gravity O (in other words, the first mount 300a and the second mount 300b are disposed at the same height). With this configuration, the fuel cell 100 is prevented from being subjected to a rotational force about an axis in parallel with the front-and-rear direction. Accordingly, the elastic properties of the respective mounts are made smaller. As a result, the complication of the structure of the respective mounts is avoided.

Moreover, in the vehicle 1000 in accordance with this embodiment, the third mount 300c is disposed at the protrusion 125 of the fluid distribution plate 120 disposed at the central portion of the fuel cell 100 (at the central portion of the stacked assembly ASSY) in the left-right direction. With this configuration, the third mount 300c can efficiently suppress vibration in the front-rear direction and the upper-lower direction.

Furthermore, in the vehicle 1000 in accordance with this embodiment, the outer periphery of the fluid distribution plate 120 projects more than the power generation unit 10 which form the projections 121a and 121b, and supply/discharge pipes and fluid-controlling valve are provided at end surfaces and side surfaces of the projections 121a and 121b. Because the fluid distribution plate 120 is made of rigid material, the supply/discharge pipes and the fluid-controlling valve can be securely fixed. In addition, the supply/discharge pipes and the fluid-controlling valve can be attached without providing an attachment boss or the like, which can reduce the number of components.

The vehicle 1000 corresponds to the "mobile unit" of the present invention, the stacked assembly ASSY corresponds to the "stacked assembly" of the present invention, the first mount 300a corresponds to the "first mount" of the present invention, the second mount 300b corresponds to the "second mount" of the present invention, the third mount corresponds to the "third mount" of the present invention, the end plates 110a and 110b correspond to the "rigid plates" of the present invention, the fluid distribution plate 120 corresponds to the "fluid distribution plate" of the present invention, the hydrogen pressure regulator 146, the air pressure adjustment valve 132, and the hydrogen shut-off valve 142 correspond to the "fluid-controlling valve" of the present invention, and the air induction pipe 130a, the air discharge pipe 130b, the hydrogen induction pipe 140a, the hydrogen discharge pipe 140b, the coolant induction pipe 160a, and the coolant discharge pipe 160b correspond to the "supply/discharge pipe" of the present invention.

The present invention is not limited to the above embodiment, and various modifications may be made without departing from the scope thereof. The following describes modifications of the above embodiment.

Figure 6:
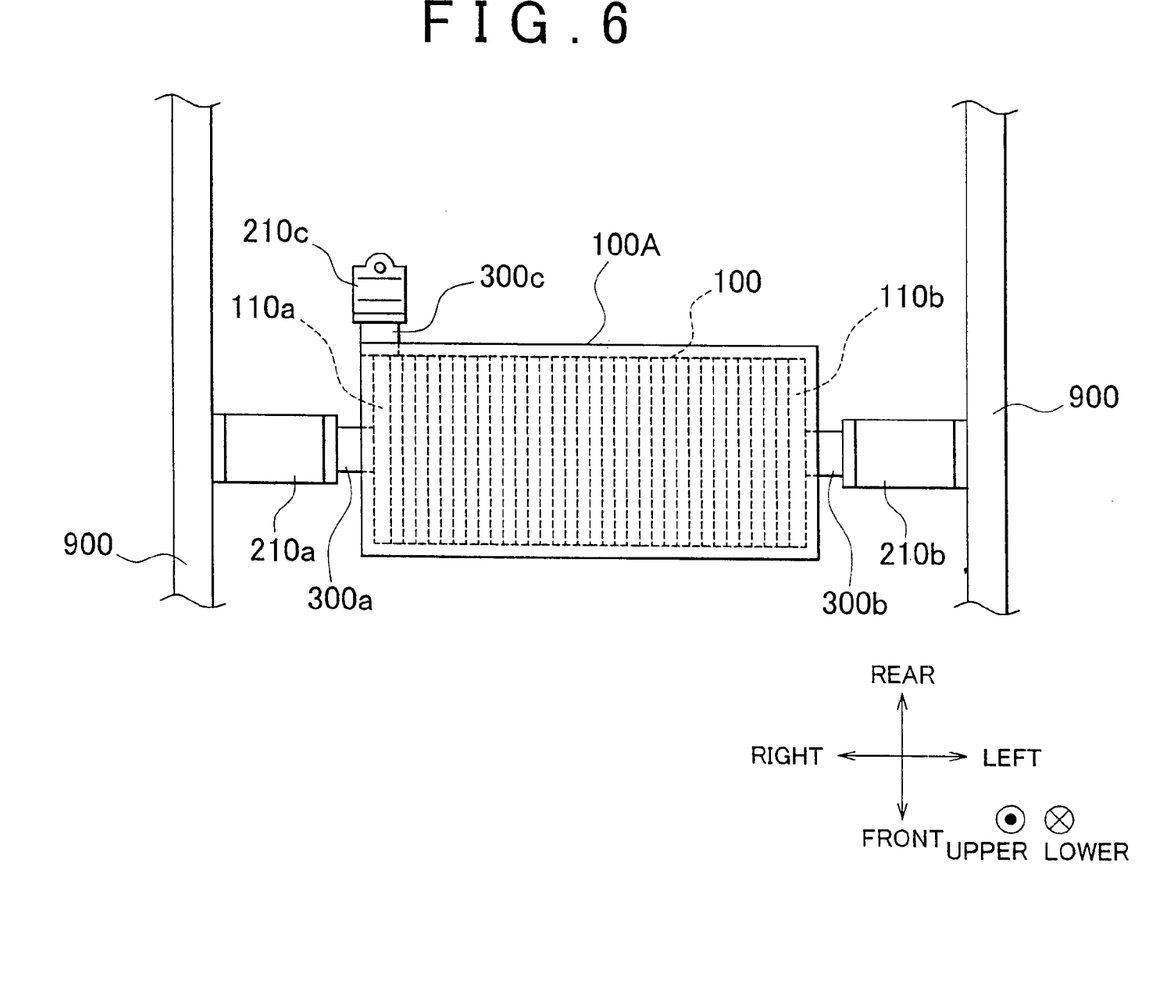
FIG. 6 shows the fuel cell mounted on the vehicle in accordance with a first modification.

FIG. 6 shows the fuel cell 100 mounted on the vehicle 1000 in accordance with a first modification. This drawing corresponds to FIG. 3A. In the vehicle 1000 in accordance with the above embodiment, the third mount 300c is connected to the fluid distribution plate 120. However, in the vehicle 1000 in accordance with the first modification, for example, the third mount 300c may be connected to the end plate 110a, as shown in FIG. 6. Alternatively, the third mount 300c may be connected to the end plate 110b. This configuration also can achieve the same effect as that of the above embodiment.

Figure 7:
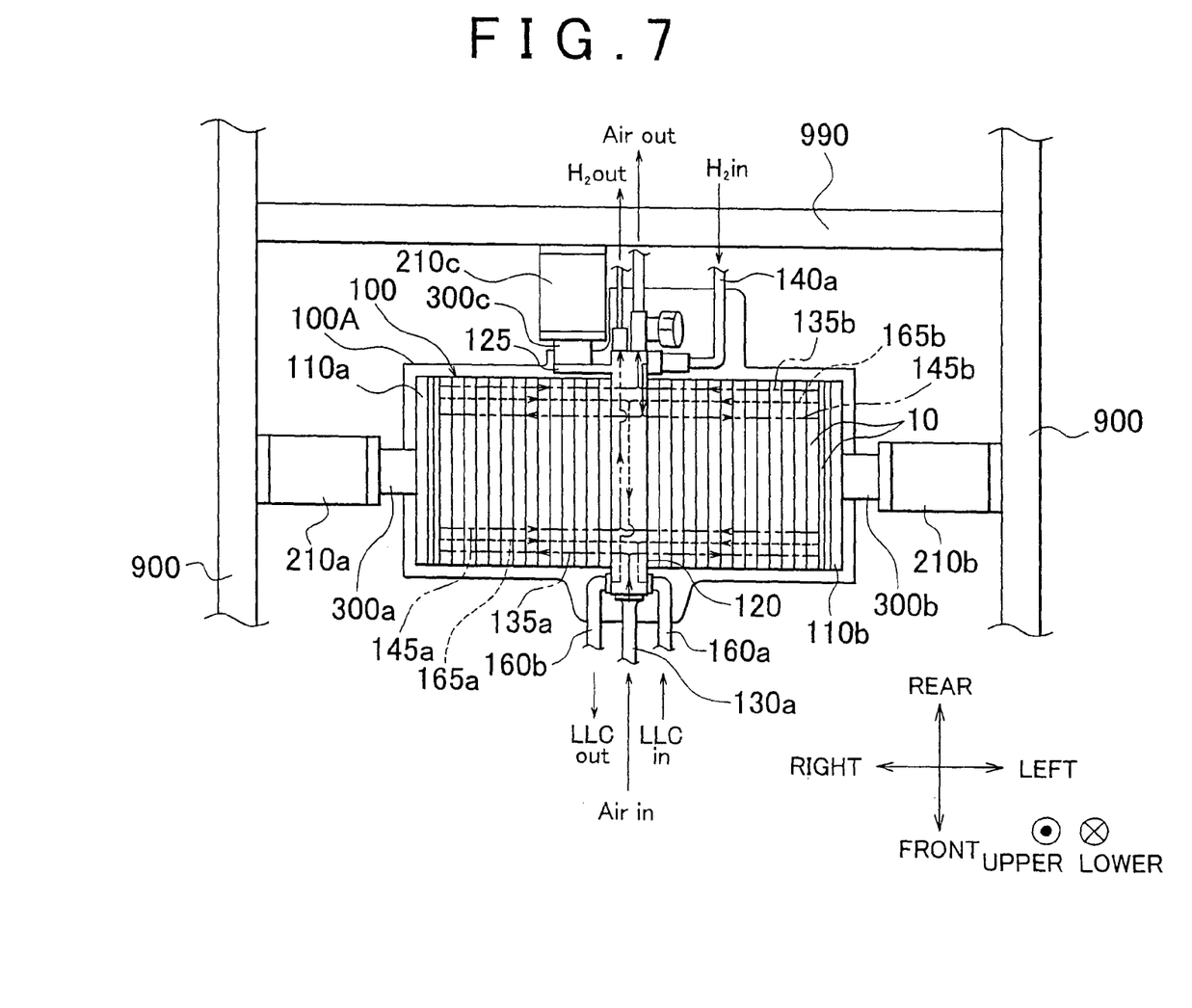
FIG. 7 shows the fuel cell mounted on the vehicle in accordance with a second modification.

FIG. 7 shows the fuel cell 100 mounted on the vehicle 1000 in accordance with a second modification. This drawing corresponds to FIG. 3A. In the vehicle 1000 in accordance with the above embodiment, the bracket 210c is fixed to the floor panel 910. However, in the vehicle 1000 in accordance with the second modification, for example, a cross frame 990 may be provided which is connected to the side frames 900 to extend between the side frames 900, as shown in FIG. 7. In addition, in the vehicle 1000, the bracket 210c may be fixed to the cross frame 990, as shown in FIG. 7. This configuration also can achieve the same effect as that of the above embodiment.

In the vehicle 1000 in accordance with the above embodiment, the fuel cell 100 is mounted on the vehicle 1000. However, in a third modification, for example, the fuel cell 100 may be mounted on other vehicles such as electric trains and steam trains, robots, airplanes, linear motor cars, and so forth.

In the vehicle 1000 in accordance with the above embodiment, the third mount 300c is disposed at the protrusion 125 of the fluid distribution plate 120 and below the center of gravity O of the fuel cell 100 to press the fuel cell 100 from the rear toward the front. However, in the vehicle 1000 in accordance with a fourth modification, for example, the projection 121a may include a protrusion 125A extending along the stacked direction, and the third mount 300c may be disposed at the protrusion 125A and below the center of gravity O of the fuel cell 100 to press the fuel cell 100 from the front toward the rear. This configuration also can obtain the effect of the above embodiment.

In the vehicle 1000 in accordance with the above embodiment, the hydrogen pressure regulator 146, the air pressure adjustment valve 132, and the hydrogen shut-off valve 142 are provided as the fluid-controlling valve at the end surfaces or the side surfaces of the projection 121a or the projection 121b of the fluid distribution plate 120. However, in a fifth modification, for example, a pressure sensor, a temperature sensor, a flow rate sensor, a pump, etc. may be provided instead of the fluid-controlling valve at the end surfaces or the side surfaces of the projection 121a or the projection 121b.

In the vehicle 1000 in accordance with the above embodiment, the fuel cell 100 is disposed under the passenger's seat 940 and below the floor panel 910. However, in a sixth modification, for example, a hole (not shown) may be formed in the floor panel 910, and the fuel cell 100 may be disposed such that a portion of the fuel cell 100 projects via the hole to the cabin defined above the floor panel 910. This configuration also can achieve the effect of the above embodiment.

In the vehicle 1000 in accordance with the above embodiment, the first mount 300a and the second mount 300b are disposed above the center of gravity O of the fuel cell 100. However, in a seventh embodiment, for example, the first mount 300a and the second mount 300b may be disposed below the center of gravity O of the fuel cell 100. In this case, the first mount 300a and the second mount 300b are disposed at the same height, as in the above embodiment. Meanwhile, the third mount 300c is disposed above the center of gravity O of the fuel cell 100. This configuration also can achieve the same effect as that of the above embodiment.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A mobile unit comprising:
a fuel cell in which a stacked assembly is composed of a plurality of stacked power generation elements held between a first rigid plate and a second rigid plate, the plurality of stacked power generation elements being stacked adjacent to one another in a stacked direction and along a central stack axis, and the central stack axis extending through a center of gravity of the fuel cell; and
a first mount, a second mount, and a third mount each of which is an insulating elastic element that suppresses vibration transferred from the mobile unit to the fuel cell, wherein:
the first rigid plate has a first outer surface facing away from the plurality of stacked power generation elements and in the stacked direction;
the second rigid plate has a second outer surface facing away from the plurality of stacked power generation elements and in the stacked direction;
the stacked assembly has a third outer surface extending in the stacked direction and facing away from the central stack axis;
the first mount is connected to the first outer surface at a position off-set from the central stack axis;
the second mount is connected to the second outer surface at a position off-set from the central stack axis;
the first mount and the second mount are configured to press the rigid plates toward each other;
the third mount is connected to the third outer surface;
the third mount is configured to press the third outer surface in a direction generally perpendicular to the stacked direction of the stacked assembly; and
the mobile unit is a vehicle, and the vehicle includes:
a plurality of side frames, disposed in parallel with each other, that extend in a longitudinal direction of the vehicle;
a first bracket coupled to the first mount and a first side frame, of the plurality of side frames, to support the first mount through the first side frame;
a second bracket coupled to the second mount and a second side frame, of the plurality of side frames, to support the second mount through the second side frame;
a floor panel disposed on the side frames; and
a third bracket that supports the third mount, wherein the third bracket is fixed to the floor panel.

2. The mobile unit according to claim 1, wherein the first mount and the second mount are both connected to the first outer surface and the second outer surface, respectively, at a position off-set from the central stack axis and above the center of gravity of the fuel cell, and the third mount is connected to the third outer surface at a position below the center of gravity of the fuel cell.

3. The mobile unit according to claim 1, wherein the first mount and the second mount are both connected to the first outer surface and the second outer surface, respectively, at a position off-set from the central stack axis and below the center of gravity of the fuel cell, and the third mount is connected to the third outer surface at a position above the center of gravity of the fuel cell.

4. The mobile unit according to claim 1, wherein the first mount and the second mount are both connected to the first outer surface and the second outer surface, respectively, at the same height with respect to the center of gravity of the fuel cell.

5. The mobile unit according to claim 4, wherein both the first mount and the second mount are positioned a predetermined distance from the third mount.

6. The mobile unit according to claim 1, wherein
either the first rigid plate or the second rigid plate includes the third outer surface, and
the third mount is connected to either the first rigid plate or the second rigid plate at the third outer surface.

7. The mobile unit according to claim 1, wherein
the stacked assembly includes a rigid fluid distribution plate, positioned between a first portion of power generation elements and a second portion of the power generation elements in the stacked assembly, that distributes at least one of a reaction gas and a cooling medium to the power generation elements,
the rigid fluid distribution plate includes the third outer surface, and
the third mount is connected to the fluid distribution plate at the third outer surface.

8. The mobile unit according to claim 2, wherein
an upper direction corresponds to a direction from an attachment surface of the mobile unit to the fuel cell, and
a lower direction corresponds to a direction from the fuel cell to the attachment surface of the mobile unit.

9. The mobile unit claim 2, wherein an upper direction corresponds to an opposite direction of a direction of gravity, and a lower direction corresponds to the direction of gravity.

10. The mobile unit according to claim 1, wherein:
the first mount and the second mount suppress vibration in the stacked direction; and
the third mount suppresses vibration in a direction perpendicular to the stacked direction.

11. The mobile unit according to claim 1, wherein the stacked direction corresponds to a left-right direction of the mobile unit of the stacked assembly lies in a longitudinal direction of the mobile unit.

12. The mobile unit according to claim 1, wherein the fuel cell includes:
a rigid fluid distribution plate provided between a first portion of the power generation elements and a second portion of the power generation elements in the stacked assembly that distributes at least one of a reaction gas and a cooling medium to the power generation elements, wherein:
the fluid distribution plate is disposed in the mobile unit; and
the fluid distribution plate includes is connected to the third mount.

13. A mobile unit comprising:
a fuel cell in which a stacked assembly is composed of a plurality of stacked power generation elements held between a first rigid plate and a second rigid plate, the plurality of stacked power generation elements being stacked adjacent to one another in a stacked direction and along a central stack axis, and the central stack axis extending through a center of gravity of the fuel cell; and
a first mount, a second mount, and a third mount each of which is an insulating elastic element that suppresses vibration transferred from the mobile unit to the fuel cell, wherein:
the first rigid plate has a first outer surface facing away from the plurality of stacked power generation elements and in the stacked direction;
the second rigid plate has a second outer surface facing away from the plurality of stacked power generation elements and in the stacked direction;
the stacked assembly has a third outer surface extending in the stacked direction and facing away from the central stack axis;
the first mount is connected to the first outer surface at a position off-set from the central stack axis;
the second mount is connected to the second outer surface at a position off-set from the central stack axis;
the first mount and the second mount are configured to press the rigid plates toward each other;
the third mount is connected to the third outer surface; and
the third mount is configured to press the third outer surface in a direction generally perpendicular to the stacked direction of the stacked assembly,
wherein the mobile unit is a vehicle, and the vehicle includes:
a plurality of side frames, disposed in parallel with each other, that extend in a longitudinal direction of the vehicle;
a first bracket coupled to the first mount and a first side frame, of the plurality of side frames, to support the first mount through the first side frame;
a second bracket coupled to the second mount and a second side frame, of the plurality of side frames, to support the second mount through the second side frame;
a cross frame that extends between the side frames; and
a third bracket that supports the third mount, wherein the third bracket is fixed to the cross frame.

* * * * *